3,775,364
Patented Nov. 27, 1973

3,775,364
PROCESS FOR CURING METHYL METHACRYLATE IN THE PRESENCE OF PEROXY CATALYSTS
Ray B. Duggins, McCarthy Drive, R.D. 1,
Chadds Ford, Pa. 19317
No Drawing. Continuation-in-part of abandoned application Ser. No. 838,688, July 2, 1969. This application Nov. 11, 1971, Ser. No. 197,974
Int. Cl. C08f 3/68
U.S. Cl. 260—41 R     14 Claims

ABSTRACT OF THE DISCLOSURE

The use of a small amount of a promoter for the catalyst used in the polymerization and curing of methyl methacrylate compositions provides a substantial reduction in the curing time. Specifically, the use of 0.05–5 parts per hundred, based on the weight of the monomeric and polymeric constituents of the polymerizable composition, of water in conjunction with a catalyst such as the hemiperester of maleic acid or preferably a metal salt thereof accelerates the curing of methyl methacrylate compositions. The acceleration is particularly significant when fillers are incorporated into the methyl methacrylate composition and when certain mercaptan chain transfer agents are included.

CROSS REFERENCE TO RELATED APPLICATIONS

The present application is a continuation-in-part of copending U.S. application Ser. No. 838,688, filed on July 2, 1969, now abandoned.

BACKGROUND OF THE INVENTION

(1) Field of invention

This invention relates to the polymerization and curing of methyl methacrylate compositions. More particularly, it relates to the improved, more rapid production of articles of polymeric methyl methacrylate, e.g., methyl methacrylate homopolymers and copolymers of methyl methacrylate with alpha-beta-ethylenically unsaturated compounds (e.g., vinyl acetate, styrene, alkyl acrylates, acrylonitrile, alkyl methacrylates, multifunctional acrylic monomers, such as alkylene dimethacrylate and alkylene diacrylates, etc.).

(2) Description of prior art

In the production of articles of polymeric methyl methacrylate and, more specifically, in the curing or polymerization of the monomers used for producing the polymeric articles, an important factor in a commercial process is the rate of curing of the methyl methacrylate composition. For the curing step, it is necessary to use a catalyst, or as it is sometimes called, an initiator. As catalysts, the prior art has suggested the use of peroxy compounds such as lauroyl peroxide and benzoyl peroxide. The use of a specific class of peroxy compounds, the hemiperesters of maleic acid, has been disclosed in U.S. Pat. 3,234,194; and, more recently, the use of the metal salt of these hemiperesters of maleic acid was disclosed in U.S. Pat. 3,362,942 as extremely useful catalysts. However, despite the effectiveness of the aforementioned catalysts, there is continued pressure for additional improvements. Thus, where previous processes may have reduced the curing time for the polymerization of methyl methacrylate to 1–2 hours, the present invention seeks to reduce the curing time even further and, in some instances, to a matter of less than 30 minutes.

SUMMARY OF THE INVENTION

The improved results of this invention are obtained by curing a polymerizable methyl methacrylate composition, preferably one formed from a sirup containing 10–35% by weight of methyl methacrylate polymer having an inherent viscosity of 0.25–1.0 dissolved in monomeric methyl methacrylate, in the presence of a small amount of a chain transfer agent, preferably 0.05–1.0 mol percent, based on the total monomer present in the polymerizable composition, of a mercaptan chain transfer agent, a small amount of peroxy compound, preferably 0.05–5 mol percent, based on the total monomer present in the polymerizable composition, of a hemiperester of maleic acid or a metal salt thereof having the formula

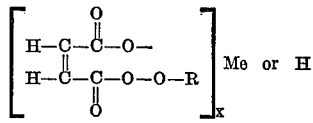 Me or H wherein

Me is a metal preferably selected from the group consisting of Group I-A metals [1] ((sodium, potassium, lithium, etc.), Group II-A metals [1] (calcium, magnesium, strontium, barium, etc.), zinc, lead, cobalt, nickel, manganese, and copper;

$x$ is an integer that has a value of 1 or more up to and including the valence of the metal; and R is a saturated tertiary alkyl radical, preferably tertiary butyl, (where $x$ is an integer that is less than the valence of the metal, the other valence or valences of the metal may be satisfied by hydroxyl or the anion of the metal compound originally used or other anion available in the system); and 0.05–5 parts per hundred, preferably 0.1–2.0 parts per hundred, based on the total weight of the monomeric and polymeric constituents of the polymerizable compositions, of a promoter (preferably water) for said peroxy compound. The polymerizable methyl methacrylate composition may also contain minor amounts of other alpha-beta-ethylenically unsaturated compounds (e.g., vinyl acetate, styrene, acrylonitrile, alkyl acrylate, alkyl methacrylate, etc.).

For the purpose of the present invention, the promoter is preferably one which is a solvent for the peroxy compound, i.e., a fluid in which the peroxy compound, to the extent such compound is used in the process (i.e., preferably up to 5 mol percent) is partially or completely soluble at a temperature of 120° F. and which does not affect the polymerization system adversely, i.e., is inert to the reactants. Besides the preferred fluid, water, other promoters that may be used include methyl alcohol, ethyl alcohol, glycerol and, in general, alcohols, diols and triols having 1–6 carbon atoms.

The process is particularly effective when at least 10% by weight, preferably 40–85%, of inert additives, preferably particles or fibers, selected from the group consisting of calcium carbonate, calcium sulfate, calcium silicate, silica and alumina, are mixed in the sirup prior to curing. It has been found that the use of calcium carbonate filler along with the calcium salt of the hemiperester of maleic acid and the mercaptan chain transfer agent of U.S. Pat. 3,154,600 enables one to use as little as 0.05 part of water per hundred parts of sirup and obtain a greater than two-fold reduction in cure time.

DETAILS OF THE PREFERRED EMBODIMENT

The starting sirup or polymer-in-monomer solution may be prepared by any of the methods described in British ---
[1] Handbook of Chemistry and Physics, 42nd edition. Chemical Rubber Publishing Co., Ohio (1960–61), pp. 448–449.

Pat. No. 870,191 or U.S. Pat. 3,154,600. Specifically, the sirup may be made by heating a small amount of a polymerization initiator in solution in the methacrylic ester and in the presence of a chain transfer agent at a suitable pressure and temperature. Heating is continued until the solution reaches a predetermined viscosity. Thereafter, the hot solution is quenched by the addition of cold monomer containing a polymerization inhibitor. More specifically, a sirup having a viscosity of 0.5–50 poises at 25° C. can be produced from methyl methacrylate by heating the monomeric methyl methacrylate in a jacketed kettle at a temperature of 50–150° C. under refluxing conditions. Atmospheric pressure is used and the refluxing material is stirred. Heating is conducted in the presence of a very small amount of initiator and from 0.05–1.0 mol percent of a chain transfer agent such as the alkyl mercaptans and the mercaptans described in U.S. Pat. 3,154,600. When a bulk viscosity in the range of 0.5 to 50 poises, which corresponds to an inherent viscosity of 0.25–1.0, is attained and the initiator content has been reduced substantially to zero, i.e., below 20 parts per million, the polymerization is stopped by cooling in any suitable manner. One method of cooling involves adding 1–10% by weight of cold methyl methacrylate containing sufficient hydroquinone or other polymerization inhibitor to inhibit further polymerization of the methyl methacrylate.

For the purpose of the present invention, the preferred sirup contains 10–35% by weight of the methyl methacrylate polymer dissolved in the methyl methacrylate monomer. The polymer has an inherent viscosity of 0.25–1.0 determined at 20° C. using a solution of 0.50 gram of the polymer per 100 milliliters of chloroform in accordance with the method described in F. W. Billmeyer, Textbook of Polymer Chemistry, Interscience Publishing Inc. (1957), page 128. As mentioned previously, the polymer may also be a copolymer involving a major portion of the methyl methacrylate monomer with such monomers as vinyl acetate, styrene, methyl acrylate, ethyl acrylate, butyl acrylate, cyclohexyl acrylate, ethyl methacrylate, butyl methacrylate, cyclohexyl methacrylate, etc.

The polymerizable composition may also contain a cross-linking agent added to the sirup in an amount up to 20% by weight upon completion of quenching. Any suitable poly-unsaturated, cross-linking agent may be used, e.g., ethylene glycol dimethacrylate, propylene glycol dimethacrylate, polyethylene glycol dimethacrylate, divinyl benzene, triallyl cyanurate, and diallyl phthalate. If desired, a portion, i.e., up to about 2% of the cross-linking agent may be added to the preferred sirup composition prior to quenching.

Specifically, the preferred process of this invention involves adding to the polymer-in-monomer solution the hemiperester of maleic acid, e.g., monotertiary-butyl peroxy-maleate, sometimes referred to as t-butyl peroxy maleic acid, in combination with a basic compound of the desired metal. As such basic compounds, one may use any metal compound that will react with the acid substituent of the hemiperester to form the metal salt of the hemiperester. Such basic compounds include but are not limited to the oxides or hydroxides of the metals; the carbontes of sodium, potassium or zinc; the acetates of sodium, potassium, copper, strontium, magnesium, lead, cobalt, manganese; the acid phthalates, bicarbonates, benzoates, phosphates, sulfides, methacrylates, etc. of sodium and potassium. Although it is most practical to add the basic compound after first dissolving the hemiperester of maleic acid in the polymer-in-monomer sirup, it is not essential. In fact, a very useful mode of conducting the process involves the dissolution of the hemiperester in one portion of the sirup and the suspension of the basic compound in another portion of the sirup. As long as the two portion are kept separate, they each will have relatively long pot lives. However, when they are mixed or fed as two streams into a common container, rapid curing results. The curing may be accomplished autogenically by merely exposing the sirup containing the metal salt of the hemiperester of maleic acid to a temperature of 15–40° C. Although elevated temperatures and higher pressures may be used, they are not necessary.

In a particularly impressive process from the standpoint of rapidity of the curing, a small residual amount of the mercaptan chain transfer agent used in preparing the sirup is retained for the curing step or is added for the curing step. Thus, the curing or polymerization of the sirup is carried out in the presence of the mercaptan and the metal salt of the hemiperester of maleic acid. The most useful mercaptans are those disclosed in U.S. Pat. 3,154,600. Their structure is reproduced below:

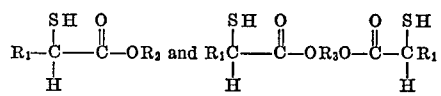

in which the R groups consist of the following substituents:

$R_1$=hydrogen, lower alkyl, aryl, carboxymethyl, carboalkoxymethyl, $R_2$=hydrogen, lower alkyl, aryl, alkoxyalkyl, alkoxyalkoxyalkyl, and $R_3$=alkylene, polyalkylene, alkylene oxide and polyalkylene oxide.

Some specific chain transfer agents include glycol dimercaptoacetate and isooctyl mercaptoacetate.

As mentioned previously, the sirup may be mixed with as much as 85% by weight of an inert additive without adversely affecting, and in many cases contributing to the improvements obtained by the process of this invention. Such additives include glass fibers, powdered metals, carbon black, clay, titania as well as the previously mentioned calcium salts, silica and alumina, and any other toughening, filling, coloring or strengthening materials. Such fillers can be any of those that do not interfere with the polymerization of the methyl methacrylate composition.

The polymerizable compositions of the present invention may be used to fabricate all types of polymeric articles. Thus, the composition may be pored on a corrugated surface to produce sheets. The composition may be poured into molds or other fabrics, metals or layers of glass to provide useful products. The composition may also be used as a laminating layer for wood and other plastics.

The preferred hemiperester for forming the metal salt thereof, as stated previously, is monotertiary-butyl peroxy-maleate. However, other useful hemiperesters include those where the saturated tertiary alkyl radical of the hemiperester is t-amyl, 1-methylcyclohexyl and p-menthyl. The metal salt of the hemiperester of the difunctional acid should usually be present in an amount greater than 0.05 mol percent based on the total monomer present in the polymerizable composition. The upper limit of 5 mol percent is merely to indicate that no additional advantage seems to be obtained by adding more than that percentage of the salt. If desired, other initiators may be used with the metal salt of the hemiperester. In addition, curing aids may be used. These include the chlorides of antimony and soluble copper salts as disclosed in U.S. Pat. 3,084,068, the chlorides of tin, etc.

The important improvements obtained by the present invention will be more clearly understood by referring to the examples which follow. These examples, which illustrate specific embodiments of the present invention, should not be construed to limit the invention in any way.

EXAMPLES 1–7

A sirup of about 22% by weight of methyl methacrylate homopolymer dissolved in methyl methacrylate monomer, the polymer having an inherent viscosity of about 0.4, and about 2.0% by weight of ethylene glycol dimethacrylate (EDMA), is prepared by partial polymerization in situ. To 100 parts of this sirup is added 150 parts of particulate calcium carbonate fillers [2], 0.2 part of wax [3], 0.25 part of glycol dimercaptoacetate, 0.5 part of tertiary-butyl peroxy maleic acid in the form of a paste [4] and various amounts of water as shown in Table I.

Specifically, the mixture of each example is prepared by first blending the sirup, the calcium carbonate filler and the wax at a temperature below 85° F. and then applying a vacuum for 15 minutes. Thereafter, the remaining comopnents are added and the mixture is stirred for 30 seconds. The mixture is then poured to a depth of ⅝-inch into a 2-inch wide aluminum tray, each tray being surrounded by ½-inch thick fiberglass insulation. The mixture is then permitted to cure at room temperature (76–78° F.).

The temperature of the mixture is sensed throughout the curing step. The time for the reaction mixture to reach its maximum temperature, the cure time, is a suitable measurement for determining substantially complete polymerization.

It will be noted from the following table that as little as 0.1 part of water per hundred parts of the sirup produced an improvement in curing time; that the use of 0.5–5.0 parts per hundred, based on the weight of the sirup, of water provided significant improvements in curing time; and that the use of more than 3.0 parts per hundred of water did not seem to provide any additional improvements in curing time; if anything, it would seem to produce an increase in time. It should also be noted that the absence of a chain transfer agent, as in Controls B and C, produced no cure within any reasonable time.

TABLE I

| Example | Water (parts per hundred) | Time to max. temp. (minutes) | Max. temp. (° F.) |
|---|---|---|---|
| 1 | .1 | 66 | 232 |
| 2 | .5 | 37 | 239 |
| 3 | 1.0 | 21 | 253 |
| 4 | 2.0 | 16 | 258 |
| 5 | 3.0 | 17 | 246 |
| 6 | 4.0 | 18 | 248 |
| 7 | 5.0 | 22 | 249 |
| Control: | | | |
| A | 0 | 96 | 235 |
| B [1] | 1.0 | (2) | |
| C [1] | 2.0 | (2) | |

[1] No chain transfer agent.
[2] No cure after 4.5 hrs.

EXAMPLES 8–11

In these examples, the procedure follows substantially that disclosed in the previous examples except that the sirup represents 37.5% by weight, the calcium carbonate filler represents 62.5% by weight. The sirup again contains about 2.0% of EDMA. Also 0.187 part of the glycol dimercaptoacetate transfer agent per 100 parts of sirup is used, and various amounts of calcium hydroxide to form the calcium salt of the tertiary-butyl peroxy maleic acid as well as various amounts of water are used.

It will be noted that, although as set forth in U.S. Pat. 3,362,942 the calcium salt of the perester provides significant improvements in curing time, the addition of as little as 0.05 part of water per 100 parts of sirup provides further significant improvements:

TABLE II

| Example | Ca(OH)₂ (p.p.h.) | Water (p.p.h.) | Time to max. temp. (minutes) | Max. temp. (° F.) |
|---|---|---|---|---|
| Control A | 0.197 | 0.0 | 138 | 225 |
| 8 | 0.197 | 0.05 | 54 | 235 |
| 9 | 0.197 | 0.1 | 27 | 254 |
| Control B | 0.387 | 0 | 86 | 228 |
| 10 | 0.387 | 0.05 | 35 | 241 |
| 11 | 0.387 | 0.1 | 14 | 261 |

[2] Gama Sperse® manufactured by Georgia Marble Company.
[3] Sunoco 4412 wax manufactured by Sun Oil Company.
[4] Luperox® PMA manufactured by Wallace and Tiernan Company.

EXAMPLES 12–16

The procedure of the previous examples is repeated using the sirup of Examples 1–7, the wax, 0.25 part per hundred of the glycol dimercaptoacetate chain transfer agent, 0.5 part per hundred of the tertiary-butyl peroxy maleic acid and various amounts of water. No calcium hydroxide is used nor is any filler used.

It should be noted that the amount of water required to provide any substantial improvement in cure time is significantly higher than the amount of water that provides improvements in cure time when the calcium carbonate filler is used alone as in Examples 1–7 or in combination with calcium hydroxide as in Examples 8–11.

TABLE III

| Example | Water (p.p.h.) | Time to max. temp. (minutes) | Max. temp. (° F.) |
|---|---|---|---|
| Control: | | | |
| A | 0 | (1) | |
| B | 0.1 | (1) | |
| C | 0.2 | (1) | |
| D | 0.5 | (1) | |
| 12 | 1.0 | 157 | 214 |
| 13 | 2.0 | 149 | 231 |
| 14 | 3.0 | 133 | 248 |
| 15 | 4.0 | 95 | 256 |
| 16 | 5.0 | 73 | 264 |

[1] No cure after 5.5 hrs.

EXAMPLES 17–24

The procedure of Examples 1–7 is repeated using 100 parts of the sirup, 150 parts of the calcium carbonate filler, 0.5 part per hundred of the tertiary-butyl peroxy maleic acid catalyst, 0.25 part per hundred of the glycol dimercaptoacetate chain transfer agent and various amounts of a promoter other than water, specifically ethanol, methanol and glycerin.

It will be noted from the following table that although the curing times are relatively high, there is a significant improvement obtained when at least 1 part of the promoter per 100 parts of sirup is used and, in the case of methanol and glycerin, when as low as 0.5 part per hundred based on the weight of the sirup of the promoter is used.

TABLE IV

| Example | Promoter (p.p.h.) | Time to max. temp. (minutes) | Max. temp. (° F.) |
|---|---|---|---|
| Control A | 0 | 160 | 233 |
| 17 | 0.5 methanol | 123 | 239 |
| 18 | 0.5 glycerin | 72 | 255 |
| 19 | 1.0 ethanol | 139 | 249 |
| 20 | 1.0 methanol | 121 | 233 |
| 21 | 1.0 glycerin | 52 | 256 |
| 22 | 1.0 ethanol | 122 | 213 |
| 23 | 2.0 methanol | 120 | 210 |
| 24 | 2.0 glycerin | 52 | 258 |

EXAMPLE 25

Into a water-cooled stainless steel tank is placed 99 kilograms of a sirup of about 22% by weight methyl methacrylate homopolymer in about 76% by weight of methyl methacrylate monomer, the polymer having an inherent viscosity of about 0.4, the sirup also contained about 2.0% by weight of EDMA. About 40 grams of water is added to obtain a concentration of .07 part of water per 100 parts of sirup. Thereafter, incremental quantities of calcium carbonate filler are added with constant stirring until 159 kilograms had been added while the temperature of the mixture was maintained below 85° F. Thereafter, 212 grams of the glycol dimercaptoacetate is added and the mixture evacuated at a pressure of 20 inches of mercury, and a temperature of 78° F. for 30 minutes.

The resultant slurry is then pumped into a high speed mixing head at a rate of 3,313 grams per minute where it is combined with 28 grams per minute of a paste containing 25% tertiary-butyl peroxy maleic acid and 89 grams per minute of a paste containing 10% calcium hydroxide, 88% of the polymer-in-monomer sirup and 2% colloidal silica. The combined stream is then piped through a flexible line into a reciprocating casting head and pumped at a rate of 3.43 kilograms per minute over a continuous moving stainless steel belt casting surface covered by a loose smooth sheet of unplasticized polyvinyl alcohol release film of 1.5 mil thickness. Over the polymer is then stretched film of 1.5 mil thickness. Over the polymer is then stretched a similar sheet of a plasticized film. The film-covered polymerizing stream is then passed under a gauging shoe which compresses the stream to a ¼-inch maximum thickness. The mix peaks at a temperature of 240° F. at a point 15.5 feet from its initial contact with the casting surface, resulting in a total 99 plus percent cure within 10.3 minutes with the belt speed at 1.5 ft. per minute.

EXAMPLE 26

In a process similar to that set forth in Examples 1–7, a methyl methacrylate composition containing 340 parts of methyl methacrylate monomer, 540 parts of particulate alumina trihydrate filler having an average particle size of 6.5–8.5 microns, 31.2 parts of a 10% calcium hydroxide in monomer slurry, 9.6 parts of tertiary-butyl peroxy maleic acid in the form of a paste [5], 0.96 part of glycol dimercaptoacetate and 1.92 parts of water is prepared.

Specifically, the mixture can be prepared by blending the monomer and the alumina filler at a temperature below 85° F. and then applying a vacuum for 15 minutes. Thereafter the remaining components are added and the mixture is stirred for 30 seconds. The mixture is then poured to a depth of ⅝ inch into a 2-inch wide aluminum tray, and the mixture is permitted to cure at room temperature (76–78° F.). From Table V it can be seen that the use of as little as 0.5 p.p.h. of water based on the monomeric and polymeric constituents of the polymerizable composition produced an article that cured in 29 minutes.

TABLE V

Example 26
Time to max. temp. (min.) 29
Maximum temporary (° F.) 266

What is claimed is:

1. A process for preparing a methyl methacrylate polymer selected from the group consisting of methyl methacrylate homopolymers and copolymers of methyl methacrylate with alpha-beta-ethylenically unsaturated compounds which comprises polymerizing or curing a sirup containing 10–35% by weight of methyl methacrylate polymer, said polymer having an inherent viscosity of 0.25–1.0, in monomeric methyl methacrylate in the presence of a small amount of a peroxy compound, a small amount of a chain transfer agent, and .05 to 5 parts per hundred, based on the weight of the sirup, of water as a promoter for said peroxy compound.

2. A process as in claim 1 wherein said sirup also contains a substantial amount of inert additives.

3. A process as in claim 2 wherein said inert additives are selected from the group consisting of calcium carbonate, calcium sulfate, calcium silicate, silica and alumina.

4. A process as in claim 2 wherein said inert additive is calcium carbonate.

5. A process as in claim 1 wherein said peroxy compound has the following formula:

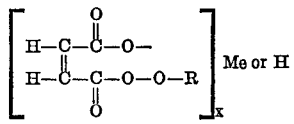 Me or H wherein

[5] Luperox® PMA manufactured by Wallace and Tiernan Company.

Me is a metal selected from the group consisting of Group I-A metals, Group II-A metals, zinc, lead, cobalt, nickel, manganese and copper;

$x$ is an integer having a value of from 1 to the valence of the metal; and

R is a saturated tertiary alkyl radical.

6. A process as in claim 1 wherein said chain transfer agent is a mercaptan chain transfer agent.

7. A process as in claim 6 wherein said mercaptan chain transfer agent is selected from the group consisting of glycol dimercaptoacetate and isooctyl mercaptoacetate.

8. A process for preparing a methyl methacrylate polymer selected from the group consisting of methyl methacrylate homopolymers and copolymers of methyl methacrylate with alpha-beta-ethylenically unsaturated compounds which comprises polymerizing or curing a sirup containing 10–35% by weight of methyl methacrylate polymer, said polymer having an inherent viscosity of 0.25–1.0, in monomeric methyl methacrylate in the presence of 0.05–5 mol percent of a peroxy compound having the following formula:

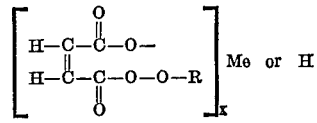 Me or H wherein
Me is a metal selected from the group consisting of Group I-A metals, Group II-A metals, zinc, lead, cobalt, nickel, manganese and copper;

$x$ is an integer having a value of from 1 to the valence of the metal; and

R is a saturated tertiary alkyl radical;

0.05–1 mol percent of a mercaptan chain transfer agent; and .05–5 parts per hundred, based on the weight of the sirup, of water as a promoter for said peroxy compound.

9. A process as in claim 8 wherein said sirup also contains a substantial amount of inert additives.

10. A process as in claim 9 wherein said inert additives are selected from the group consisting of calcium carbonate, calcium sulfate, calcium silicate, silica and alumina.

11. A process as in claim 9 wherein said inert additive is calcium carbonate.

12. A process as in claim 10 wherein said peroxy compound is a metal salt of tertiary-butyl peroxy maleic acid.

13. A process as in claim 11 wherein said peroxy compound is the calcium salt of tertiary-butyl peroxy maleic acid.

14. A process as in claim 13 wherein said mercaptan chain transfer agent is selected from the group consisting of glycol dimercaptoacetate and isooctyl mercaptoacetate.

References Cited

UNITED STATES PATENTS

| 3,405,088 | 10/1968 | Slocum | 260—41 |
| 3,154,600 | 10/1964 | Munn | 260—41 |
| 3,234,194 | 2/1966 | Slocum | 260—89.5 |
| 3,362,942 | 1/1968 | Munn | 260—89.5 |

OTHER REFERENCES

Terenzi et al.: Engineering Study of Continuous Polymerization of Acrylic Monomers, in I & EC Fundamentals, vol. 8, No. 2, May 1969, pp. 199–205.

THEODORE MORRIS, Primary Examiner

J. H. DERRINGTON, Assistant Examiner

U.S. Cl. X.R.

260—41 A, 86.1 R, 89.5 A, 89.5 AW, 881, 885